Patented Sept. 12, 1939

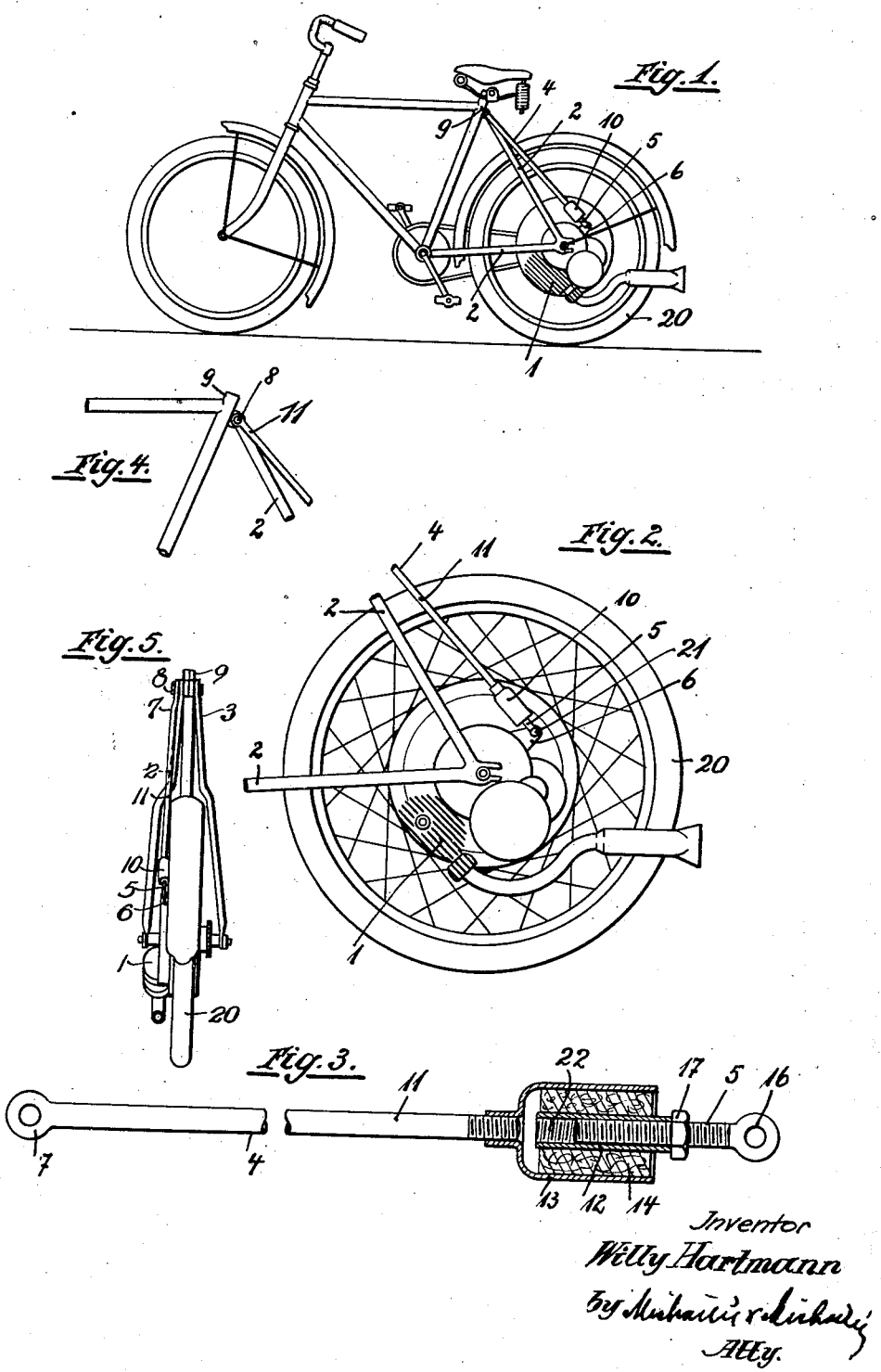

2,172,473

UNITED STATES PATENT OFFICE 2,172,473

BICYCLE DRIVE

Willy Hartmann, Stuttgart, Germany, assignor to Fichtel & Sachs A. G., Schweinfurt-on-the-Main, Germany Application November 28, 1936, Serial No. 113,173
In Germany December 5, 1935

2 Claims. (Cl. 180—33)

My invention relates to bicycles driven by an engine mounted on the rear wheel axle. It has particular reference to the kind of drive disclosed in the specification of German Patent No. 621,232, in which the engine is mounted on the rear wheel axle for free angular motion and braced relative to the frame only by a radially extending resilient member acting on the horizontal tubes of the frame, this arrangement offering the advantage that all shocks and concussions which arise during the operation of the engine, are taken up by these tubes.

It is an object of my invention to improve this type of engine suspension by providing means for absorbing the shocks and concussions transmitted onto the frame during the operation of the engine not in the transverse, but in the longitudinal direction of the frame tubes, thereby avoiding any danger of these tubes being bent or broken.

To this end a shock absorber is hinged to the movable motor casing and connected by a rod to the saddle pin socket of the frame. This rod may be hinged to the clamping screw of the saddle pin, whereby the assembling of the device is rendered very simple.

If the buffer member proper is an elastic rubber cushion or the like, the small rapidly succeeding concussions will be noiselessly absorbed.

The particularly advantageous arrangement of the resilient intermediate member according to this invention consists therein, that this member has the form of a shock absorber hinged to the motor casing and connected with the saddle pin socket of the frame by a rod. This rod can be hinged in a simple manner to the clamping screw of the saddle pin, whereby the assembling of the device is also rendered extremely simple.

If the resilient intermediate member is formed by an elastic rubber cushion or some similar buffer device, such devices will also noiselessly absorb the small rapidly succeeding concussions, which would create disagreeable noises if steel springs were inserted.

In the drawing affixed to this specification and forming part thereof, a device embodying my invention is illustrated diagrammatically by way of example.

In the drawing

Fig. 1 is a side elevation of a bicycle with the device mounted thereon.

Fig. 2 is a similar view, drawn to a larger scale, of the rear part of the frame and rear wheel with the device mounted in place, while Fig. 3 is a side elevation, partly in longitudinal section, drawn to a still larger scale, of the intermediate member.

Fig. 4 is a similar view of the frame tube supporting the saddle showing the connection with the shock absorbing member, and Fig. 5 is a rear view of the rear frame and wheel structure including the motor.

Referring to the drawing, 1 is the engine, which is rotatably mounted on the axle or hub of the rear wheel 20 of the bicycle, which is supported in bearings of the rear frame tubes 2, 3. The buffer member 4, which serves for transmitting the reaction moment of the driving forces of the motor onto the frame, is linked by its bottom end 5 by means of a bolt 21 to an arm 6 radially extending from the motor casing, while its top end 7 is pivoted to the clamping screw 8 of the saddle supporting socket.

As shown in Fig. 3, the shock absorbing member substantially consists of a buffer device 10 and of the rod 11. The buffer device is here formed by an inner sleeve 12, an outer sleeve or casing 13 and an elastic rubber cushion 14 of annular cross section inserted between the two sleeves, which allows the inner sleeve to somewhat shift axially relative to the outer sleeve.

To the outer sleeve 13 the rod 11 is connected by screwing, riveting in or in some other way. The inner sleeve is formed with internal screw threading 22, into which is screwed a connecting member 5, the outwardly projecting end of which is formed with an eye 16, which takes up the bolt 21 passing through the extension 6 of the motor casing. By adjusting the member 5 in the inner sleeve 12 and fixing it in position by means of a nut 17 the all-over length of the intermediate buffer member can be adjusted according to requirements.

I claim:

1. In a bicycle, in combination, a frame having a forked rear frame triangle, a rear wheel axle supported in said fork and an engine mounted for angular motion on and concentrically with said axle between the fork members, a radial arm extending from said engine and a rod-shaped buffer member connecting said arm with the top corner of said rear frame triangle so as to extend in a plane situated intermediate the fork members, for preventing impulses deriving from the engine from applying laterally on said frame.

2. The combination of claim 1, in which the rod extends between the radial arm and the clamping screw for the saddle pin.

WILLY HARTMANN.